United States Patent
Brief et al.

(10) Patent No.: US 10,891,078 B2
(45) Date of Patent: Jan. 12, 2021

(54) STORAGE DEVICE WITH A CALLBACK RESPONSE

(71) Applicant: Western Digital Technologies, Inc., San Jose, CA (US)

(72) Inventors: David C. Brief, Modiin (IL); Rotem Sela, Hod Hasharon (IL); Yoav Markus, Tel-Aviv (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/370,280

(22) Filed: Mar. 29, 2019

(65) Prior Publication Data

US 2019/0391761 A1 Dec. 26, 2019

Related U.S. Application Data

(60) Provisional application No. 62/688,759, filed on Jun. 22, 2018.

(51) Int. Cl.
*G06F 12/00* (2006.01)
*G06F 3/06* (2006.01)
*G06F 9/4401* (2018.01)

(52) U.S. Cl.
CPC .......... *G06F 3/0659* (2013.01); *G06F 3/0604* (2013.01); *G06F 3/0614* (2013.01); *G06F 3/0673* (2013.01); *G06F 9/4418* (2013.01)

(58) Field of Classification Search
CPC .... G06F 3/0659; G06F 3/0604; G06F 3/0614; G06F 3/0673; G06F 9/4418
See application file for complete search history.

(56) References Cited

U.S. PATENT DOCUMENTS

| | | |
|---|---|---|
| 2015/0100745 A1 | 4/2015 | Konda et al. |
| 2016/0011790 A1 | 1/2016 | Rostoker et al. |
| 2019/0034364 A1 | 1/2019 | Lee et al. |

*Primary Examiner* — Gurtej Bansal
(74) *Attorney, Agent, or Firm* — Patterson & Sheridan, LLP; Steven H. Versteeg

(57) ABSTRACT

A method of sending a command from a slave storage device to a master host includes receiving an initial command from the master host. A callback response containing a requested command triggered by the initial command is sent by the slave storage device. In one embodiment, the master host is a Universal Flash Storage (UFS) host and the slave storage device is a UFS storage device. In one embodiment, the initial command is a start stop unit (SSU) command with a power condition field of sleep or powerdown and the requested command is a read buffer command. In another embodiment, the initial command is a start stop unit (SSU) command with a power condition field of active and the requested command is a write buffer command.

20 Claims, 7 Drawing Sheets

RESPONSE UPIU

| 0 xx10001b | 1 FLAGS | 2 LUN | 3 TASK TAG |
|---|---|---|---|
| 4 ID \| COMMAND SET TYPE | 5 RESERVED | 6 RESPONSE | 7 STATUS |
| 8 TOTAL EHS LENGTH (00h) | 9 DEVICE INFORMATION | 10 (MSB) DATA SEGMENT LENGTH | 11 (LSB) |
| 12 (MSB) | 13 | 14 | 15 (LSB) |
| RESIDUAL TRANSFER COUNT | | | |
| 16 | 17 | 18 | 19 |
| RESERVED | | | |
| 20 | 21 | 22 | 23 |
| RESERVED | | | |
| 24 | 25 | 26 | 27 |
| RESERVED | | | |
| 28 | 29 | 30 | 31 |
| RESERVED | | | |
| HEADER E2ECRC (omit if HD = 0) | | | |
| k (MSB) SENSE DATA LENGTH | k+1 (LSB) | k+2 SENSE DATA[0] | k+3 SENSE DATA[1] |
| ... | ... | ... | ... |
| k+16 SENSE DATA[14] | k+17 SENSE DATA[15] | k+18 SENSE DATA[16] | k+19 SENSE DATA[17] |
| DATA E2ECRC (omit if DD=0) | | | |
| NOTE 1  k = 32 if HD = 0. | | | |

STORAGE DEVICE WITH A CALLBACK RESPONSE

CROSS-REFERENCE TO RELATED APPLICATIONS

This application claims benefit of U.S. provisional patent application Ser. No. 62/688,759, filed Jun. 22, 2018, which is herein incorporated by reference.

BACKGROUND OF THE DISCLOSURE

Field of the Disclosure

Embodiments of the present disclosure generally relate to a storage device capable of informing a host of a requested command to send to the storage device.

Description of the Related Art

In storage devices, typically a host interacts with a storage device by instructing the storage device to perform certain commands. The host can be any computing device, such as a computer, a smart phone, a tablet, an automotive vehicle, a mobile device, etc. The storage device can be a non-volatile memory storage device, such as a solid state drive (SSD).

Universal Flash Storage (UFS) is an electronics standard for high performance and high power efficiency storage devices. In a UFS storage system, the host acts as a master relative to the storage device which acts as a slave. The storage device is instructed by the host to perform certain tasks such as writing data to various memory locations in the storage device, reading data from various memory locations in the storage device, and providing feedback to the host regarding completion of the respective commands.

There is a need for functionality for the storage device to send instructions to the host in a UFS storage system.

SUMMARY OF THE DISCLOSURE

In one embodiment, a method of sending a command from a slave storage device to a master host includes receiving an initial command from the master host. A callback response containing a requested command triggered by the initial command is sent by the slave storage device. The requested command is received from the master host. The requested command is executed by the slave storage device. The initial command is executed by the slave storage device.

In another embodiment, a method of operating a storage device in a storage system includes receiving a start stop unit (SSU) command with a power condition field of sleep or powerdown from the host. A callback response containing a requested read buffer is sent by the storage device to the host. The requested read buffer command is received from the host by the storage device. The requested read buffer command is executed by the storage device. The SSU command is executed by the storage device.

In still another embodiment, a method of operating a storage device in a storage system includes receiving a SSU command from the host with a power condition field of active. A callback response containing a requested write buffer command is sent to the host. The requested write buffer command is received from the host by the storage device. The requested write buffer command is executed by the storage device. The SSU command is executed by the storage device.

In one embodiment, a storage device includes a non-volatile memory and a UFS controller means. The UFS controller means is configured to send a callback response command triggered by a received command from a host. The received command is a SSU command setting a power condition of the non-volatile memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a schematic illustration of certain embodiments of a response UPIU sent from a storage device to a host.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In certain embodiment, a method of sending a command from a slave storage device to a master host includes sending a response containing a requested command as a callback to or triggered by an initial command from the host. In one embodiment, the master host is a Universal Flash Storage (UFS) host and the slave storage device is a UFS storage device. The requested command may be in one or more fields of a response UFS protocol information units (UPIU). In one embodiment, a requested read buffer command of proprietary data is triggered by a sleep or powerdown command in conjunction with a requested write buffer command of the proprietary data triggered by an active command. The storage device uses the proprietary data written to a buffer of the storage device to more quickly or more efficiently return the internal state of the storage device to an active mode from a sleep more or powerdown mode.

Figure 1:
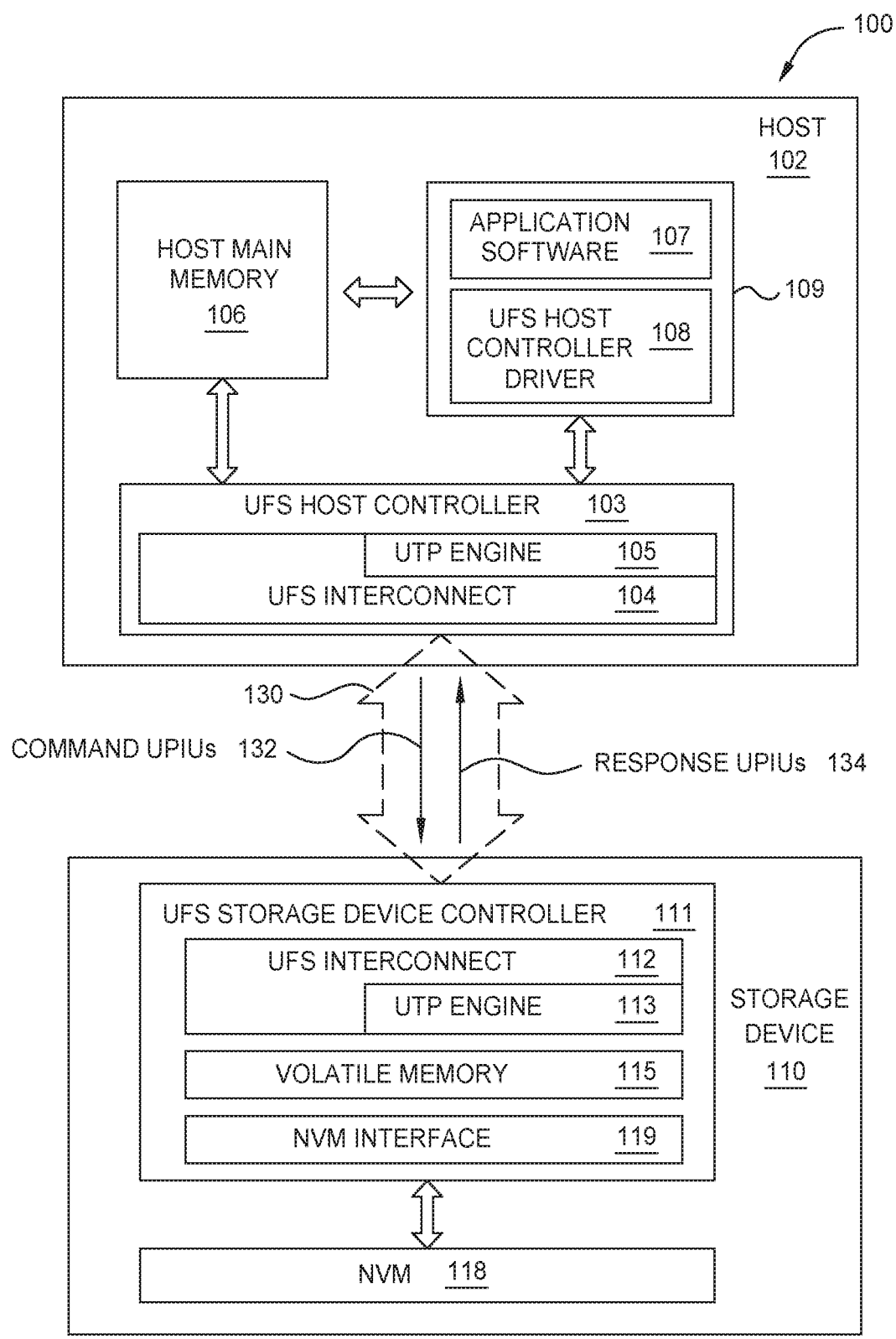
FIG. 1 is a schematic illustration of a UFS storage system according to certain embodiments.

FIG. 1 is a schematic illustration of a UFS storage system 100 according to certain embodiments. The UFS storage system 100 includes a host 102 and a storage device 110. The host 102 includes a host main memory 106, such as DRAM. A software module 109, including an application software 107 and a UFS host controller driver 108, is loaded to the host main memory 106 or other operating memory executed by a host processor. The host 102 includes a UFS host controller 103 having a UFS interconnect layer 104. The host 102 communicates with the storage device 110 through a link 130 established between phy components of the UFS interconnect layer 104 of the host 102 and phy components of a UFS interconnect layer 112 of a UFS storage device controller 111 of the storage device 110.

The UFS storage device controller 111 includes volatile memory 115 that acts as a cache for the storage device 110. Volatile memory does not retain stored data if powered off. Examples of volatile memories include dynamic random access memories (DRAM), static random access memories (SRAM), other forms of volatile memories, and combinations thereof.

The storage device 110 includes non-volatile memory (NVM) 118 that communicates with the UFS storage device controller 111 through channels of a NVM interface 119. NVM 118 is configured for long-term data storage of information and retains information after power on/off cycles. NVM 118 includes one or more arrays of non-volatile flash memory devices, such as multiple flash memory dies. Non-volatile flash memory devices may be configured in a NAND or a NOR configuration. In other embodiments, NVM 118 can be other types of memory devices, such as phase change memories, ReRAM memories, MRAM memories, electrically programmable read only memories (EPROM), electrically erasable programmable read only memories (EEPROM), and other solid-state memories.

A UFS transport protocol (UTP) engine 113 of the UFS storage device controller 111 of the storage device 110 receives commands and data from and delivers responses and data to a UTP engine 105 of the UFS host controller 103. The data packets are group into data structures called UFS protocol information units (UPIUs). The storage device 110 receives command UPIUs 132 from the host 102 and sends response UPIUs 134 to the host 102 over the link 130 as well as other types of UPIUs received and sent between the storage device and the host.

Other embodiments are not limited to a UFS storage system, but are applicable to a storage system in which the host is a master device initiating commands and the storage device is a slave device responding to commands.

FIG. 2 is a schematic illustration of certain embodiments of a response UPIU 200 sent from a storage device to a host, such as storage device 110 and host 102 of FIG. 1 or other suitable storage systems.

The response UPIU 200 contains UPIU header information plus additional information indicating a command and storage device status resulting from the successful or failed execution of a command UPIU received from the host. The storage device will generate and send the response UPIU to the host after the storage device has completed the requested task or has failed execution of the task.

The response UPIU 200 includes various fields. For example, Field 0 contains a transaction type. A type code of xx10 0001b indicates a Response UPIU transaction type. Field 1 contains a flags, such as a data overflow flag, a data underflow flag, a data out mismatch flag, and other flags. Field 2 contains a logical unit number (LUN) to which a request is targeted. The LUN is generated by the host and maintained by the host and the storage device for all UPIU transactions relating to a single request or task. Field 3 contains a task tag value. The task tag value is a register or variable generated by the host and maintained by the host and the storage device for all UPIU transactions relating to a single request or task. Field 4 contains an initiator ID. The initiator ID is an identity of the host which created the task request. Field 5 is reserved. Field 6 contains a UFS response. The UFS response indicates an overall success or failure of the series of command UPIUs and response UPIUs that make up the execution of a task. Field 7 contains a command set specific status for a specific command issued by the host. The command set status values may be a code associated with a good status, a check condition status, a condition met status, a busy status, a reservation conflict status, a task set full status, an ACA active status, a task aborted status, or other statuses. Field 8 contains a total extra header segment (EHS) length. The total EHS length indicates the size of all extra header segments (EHS) contained with the UPIU. Field 9 contains a storage device information. The storage device information indicates the information at the storage device level not necessarily related with the logical unit executing the command. Fields 10 and 11 contain a data segment length. The data segment length indicates the number of valid bytes in the data segment. Fields 12-15 contain a residual transfer count. The residual transfer count indicates a number of bytes that were not transferred between the host and the storage device. Fields 16-31 are reserved. Fields k through k+19 contain sense data fields. Sense data fields indicate information on error condition. An HD bit set to 1 in Field 0 indicates that end-to-end cyclic redundant check (CRC) of all header segments is included within the UPIU and included at the 32-bit word location following the header. When the HD bit is set to 0, Field k is set to zero. A DD bit set to 0 in Field 0 indicates that end-to-end CRC of the data segment is included within the UPIU and included at the end of the data segment. When the DD bit is set to 0, the end-to-end CRC is not supported and is omitted.

In certain embodiments, a requested command from the storage device to the host is generated in the response UPIU 200 as callback to or triggered by a certain command UPIU from the host. In certain embodiments, the requested command may be provided in one or more of the reserved fields 5 and 17-31 of the response UPIU 200. In another embodiment, the requested command may be provided in a new extra header segment of the response UPIU 200 in addition to the existing extra header segment as disclosed above or in the alternative to the existing extra header segment if omitted. The requested command may be provide in the response UPIU 200 as a specific SCSI command, a specific UFS command, a code associated with the requested command, or flag associated with the requested command. Other embodiments disclosed here are not limited to providing a requested command in a response UPIU but include providing a requested command in other types of UPIUs or providing a requested command in other types other data structures.

Figure 3:
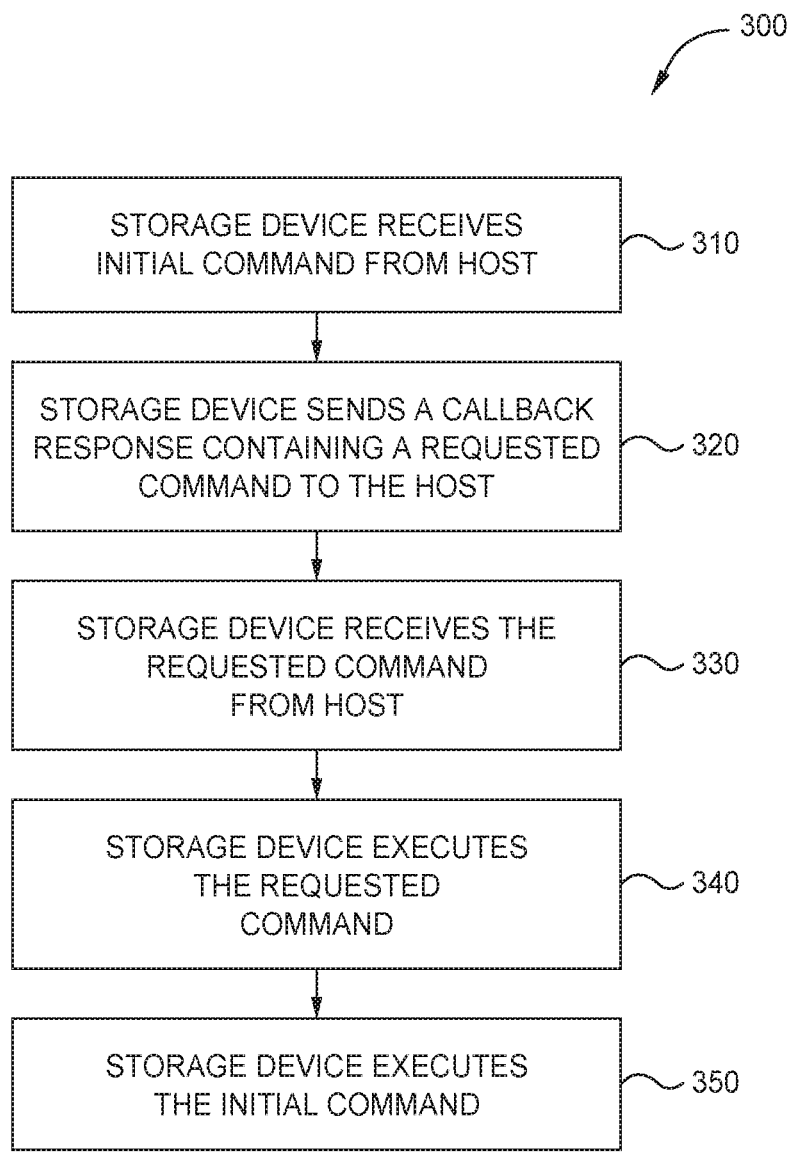
FIG. 3 is a flowchart illustrating certain embodiments of a method of a slave storage device sending a command to a master host.

FIG. 3 is a flowchart illustrating certain embodiments of a method 300 of a slave storage device sending a requested command to a master host, such as storage device 110 and host 102 of FIG. 1 or other suitable storage systems.

At block 310, a storage device receives an initial command from the host. The command may be a in the form of a command UPIU or other suitable data structure.

At block 320, the storage device sends a callback response to the host generated by the storage device as a callback to or triggered by a contingent event of a certain command received at block 310. The callback response is generated by taking the command received at block 310 as a parameter. The callback response includes a requested command that is triggered by a specific command received from the host. For a UFS storage system, the callback response containing a requested command is a response UPIU, such as a response UPIU 200 of FIG. 2 or other suitable response UPIU.

In one embodiment, the contingent event or parameter received is a SSU command with a power condition field of sleep or powerdown which causes the storage device to generate a callback response containing a read buffer command. In another embodiment, the contingent event or parameter received is a SSU command with a power condition field of active which causes the storage device to generate a callback response containing a write buffer command.

At block 330, the storage device receives the requested command from the host. The requested command is contained in the callback response, such as contained in a response UPIU. Since the storage device cannot directly send a command to the host for the host to perform to accomplish a task, the storage device generates a requested command contained in a callback response triggered by the initial command received from the host at block 310. The host sends the requested command, such as in a command UPIU, back to the storage device to execute.

At block 340, the storage device executes the requested command received from block 330. At block 350, the storage device executes the initial command. In certain embodiments, the requested command received at block 330 is executed by the storage device prior to executing the initial command received at block 310. In certain embodiments, the requested command received at block 330 is executed by the storage device simultaneously to executing the initial command received at block 310. In certain embodiments, the requested command received at block 330 is executed by the storage device after executing the initial command received at block 310.

While the storage device is a slave device to the master host device, the storage device has instructed or requested that host to provide a requested command to the storage device in the method 300 of FIG. 3. The requested command is generated in a callback response triggered by a specific command from the host. In other embodiments, the requested command may be generated in other conditional objects beside a callback object.

Figure 4:
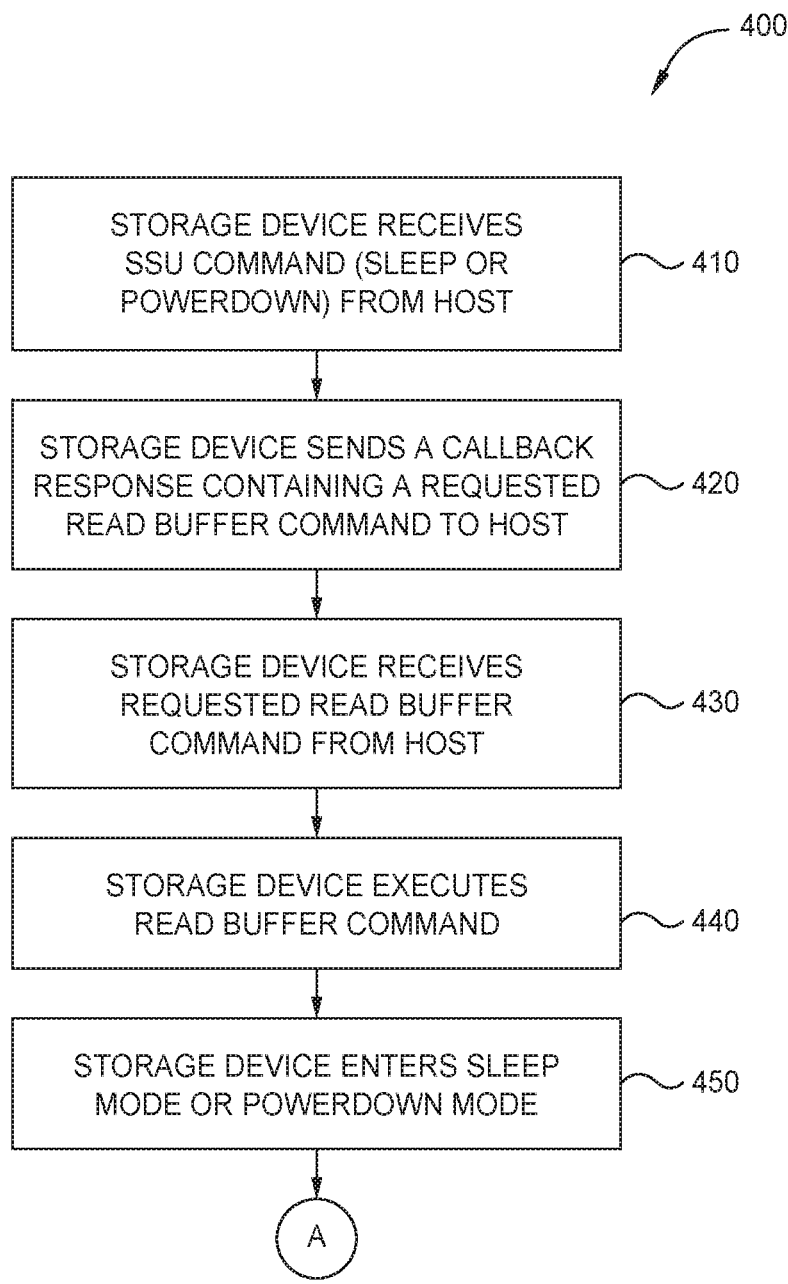
FIG. 4 is a flowchart illustrating certain embodiments of a method of a storage device sending a callback response triggered by a SSU command with a power condition of sleep or powerdown received from a host.

FIG. 4 is a flowchart illustrating certain embodiments of a method 400 of a storage device sending a callback response triggered by a SSU command with a power condition of sleep or powerdown received from a host, such as such as storage device 110 and host 102 of FIG. 1 or other suitable storage systems.

At block 410, the storage device receives a SSU command with a power condition field of sleep or powerdown from the host to put the storage device is a sleep mode or powerdown mode. The SSU command is structured as a command UPIU from the host.

At block 420, the storage device sends a callback response containing a requested read buffer command to the host. The callback response is generated by the storage device as a callback to or triggered by the SSU command received at block 410. The SSU command is a contingent event or parameter that triggers the callback response containing a requested read buffer command. The callback response containing the request read buffer command is a response UPIU in response to the command UPIU in block 410.

At block 430, the storage device receives the requested read buffer command from the host. The requested read buffer command is structured as a command UPIU from the host.

At block 440, the storage device executes the read buffer command. The storage device reads proprietary data from the buffer, such as volatile memory 115 of storage device 110 or another buffer of a suitable storage device, and sends the data of the read buffer to the host. In one embodiment, the proprietary data is part of or the entire flash related table, such as a flash translation table, a garbage collection table, a bad block table, a wear leveling table, an invalid data table, an open block table, etc. In another embodiment, the proprietary data is a virtual memory setting. In another embodiment, the proprietary data is an encryption key.

At block 450, the storage device enters sleep mode or powerdown mode. For example, the VCC to the NVM, such as NVM 118, is removed and the UFS interconnect layer, such as UFS interconnect layer 112, of the storage device is placed in sleep mode or hibernate mode.

Figure 5:
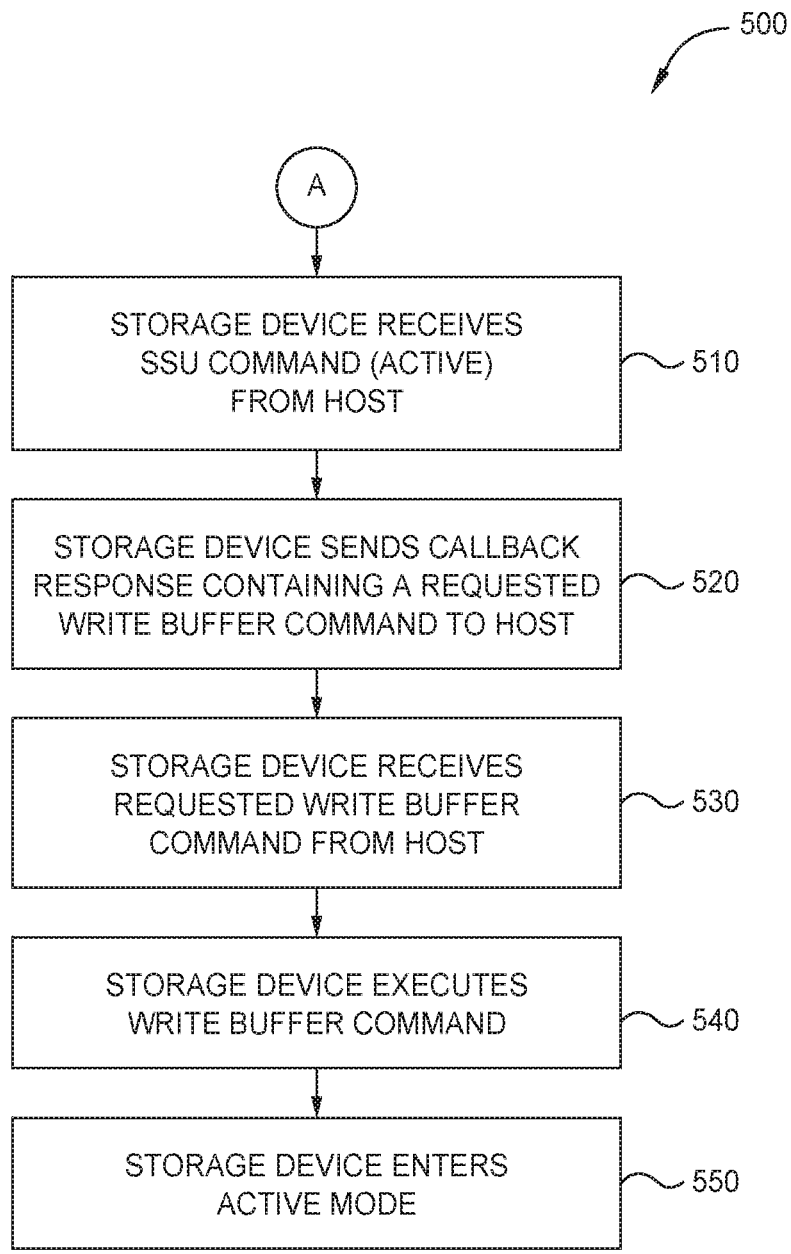
FIG. 5 is a flowchart illustrating certain embodiments of a method of a storage device sending a callback response triggered by a SSU command with a power condition of active received from a host.

FIG. 5 is a flowchart illustrating certain embodiments of a method 500 of a storage device sending a callback response triggered by a SSU command with a power condition of active received from a host, such as such as storage device 110 and host 102 of FIG. 1 or other suitable storage systems.

At block 510, the storage device receives a SSU command with a power condition field of active from the host to put the storage device is an active mode. The SSU command is structured as a command UPIU from the host.

At block 520, the storage device sends a callback response containing a requested write buffer command to the host. The callback response is generated by the storage device as a callback to or triggered by the SSU command received at block 510. The SSU command is a contingent event or parameter that triggers the callback response containing the requested write buffer command. The callback response containing the request write buffer command is a response UPIU in response to the command UPIU in block 510.

At block 530, the storage device receives the requested write buffer command from the host. The requested write buffer command is structured as a command UPIU from the host.

At block 540, the storage device executes the write buffer command. The storage device writes proprietary data to the buffer, such as volatile memory 115 of storage device 110 or another buffer of a suitable storage device, from the host. In one embodiment, the proprietary data is part of or the entire flash related table, such as a flash translation table, a garbage collection table, a bad block table, a wear leveling table, an invalid data table, an open block table, etc. In another embodiment, the proprietary data is a virtual memory setting. In another embodiment, the proprietary data is an encryption key.

At block 550, the storage device enters active mode. For example, the VCC to the NVM, such as NVM 118, is restored and the UFS interconnect layer, such as UFS interconnect layer 112, of the storage device is placed in an active mode.

In certain embodiments, the method 400 of FIG. 4 and the method of 500 of FIG. 5 may be performed separately or performed in conjunction with each other. For example, the method 400 and the method 500 provide a faster or more efficient wakeup of a storage device from a sleep mode or powerdown mode of the storage device to an active mode. For example, the storage device prior to entering sleep mode or powerdown mode generates a callback response containing a request read buffer command to read proprietary data from a buffer of the storage device to the host. This proprietary data is written back to the buffer of the storage device in a callback response containing a requested write buffer command triggered by a SSU command with a power condition of active. The proprietary data may be part of or a whole flash related table, a virtual memory setting, an encryption key, other internal state information, and combinations thereof. The proprietary data is used to quickly restore the internal state of the storage device from a sleep mode to an active mode.

Although the proprietary data may be stored on NVM of the storage device, reading and writing the proprietary data from and to the buffer of the storage device is faster or more efficient than reading proprietary data from the NVM, such as NVM 118 of the storage device 110. The interconnect layers, such as UFS interconnect layers 104, 112 of the host and storage device, are faster or more efficient that the NVM interface, such as NVM interface 119.

Figure 6:
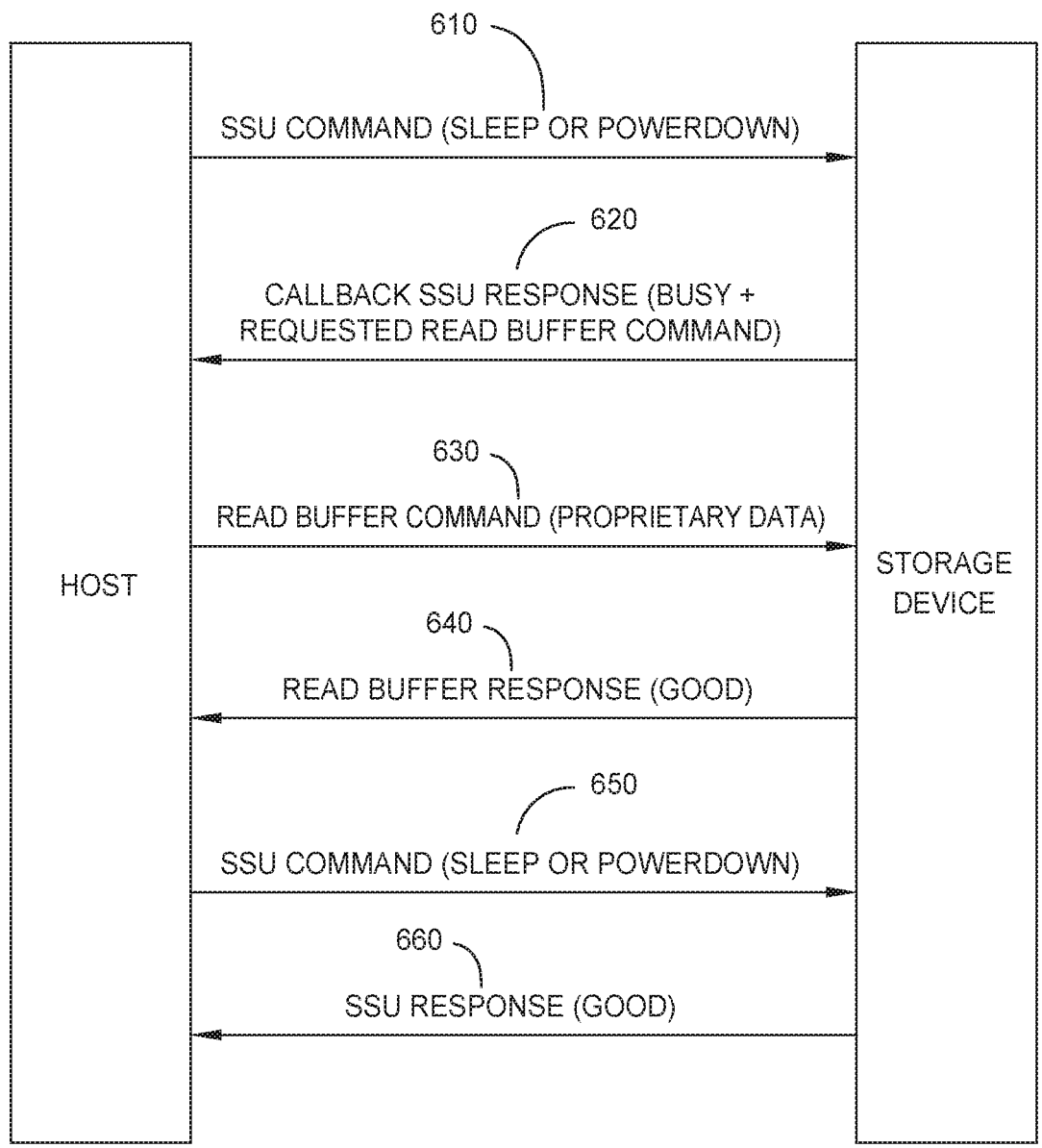
FIG. 6 is a diagram of the certain embodiments of the command and responses received and sent by the storage device from and to the host to place the storage device in a sleep mode or powerdown mode.

FIG. 6 is a diagram of the certain embodiments of the commands and responses received and sent by the storage device from and to the host, such as command UPIUs and response UPIUs received and sent by storage device 110 from and to host 102 of FIG. 1 or other suitable storage systems, to place the storage device in a sleep mode or powerdown mode.

A SSU command UPIU 610 with a power condition field of sleep or powerdown is received by the storage device from the host. A SSU response UPIU 620 with a status field of busy and with a callback response containing a requested read buffer command is sent by the storage device to the host. A read buffer command UPIU 630 is received by the storage device from the host. A read buffer response UPIU 640 with a status field of good is sent by the storage device to the host after executing the read buffer command. A SSU command UPIU 650 with a power condition field of sleep or powerdown is received by the storage device from the host. The SSU command UPIU 650 is resent by the host as a recovery action to receiving a SSU response UPIU 620 of busy. A SSU response UPIU 660 with a status field of good is sent by the storage device to the host after executing the SSU command.

Figure 7:
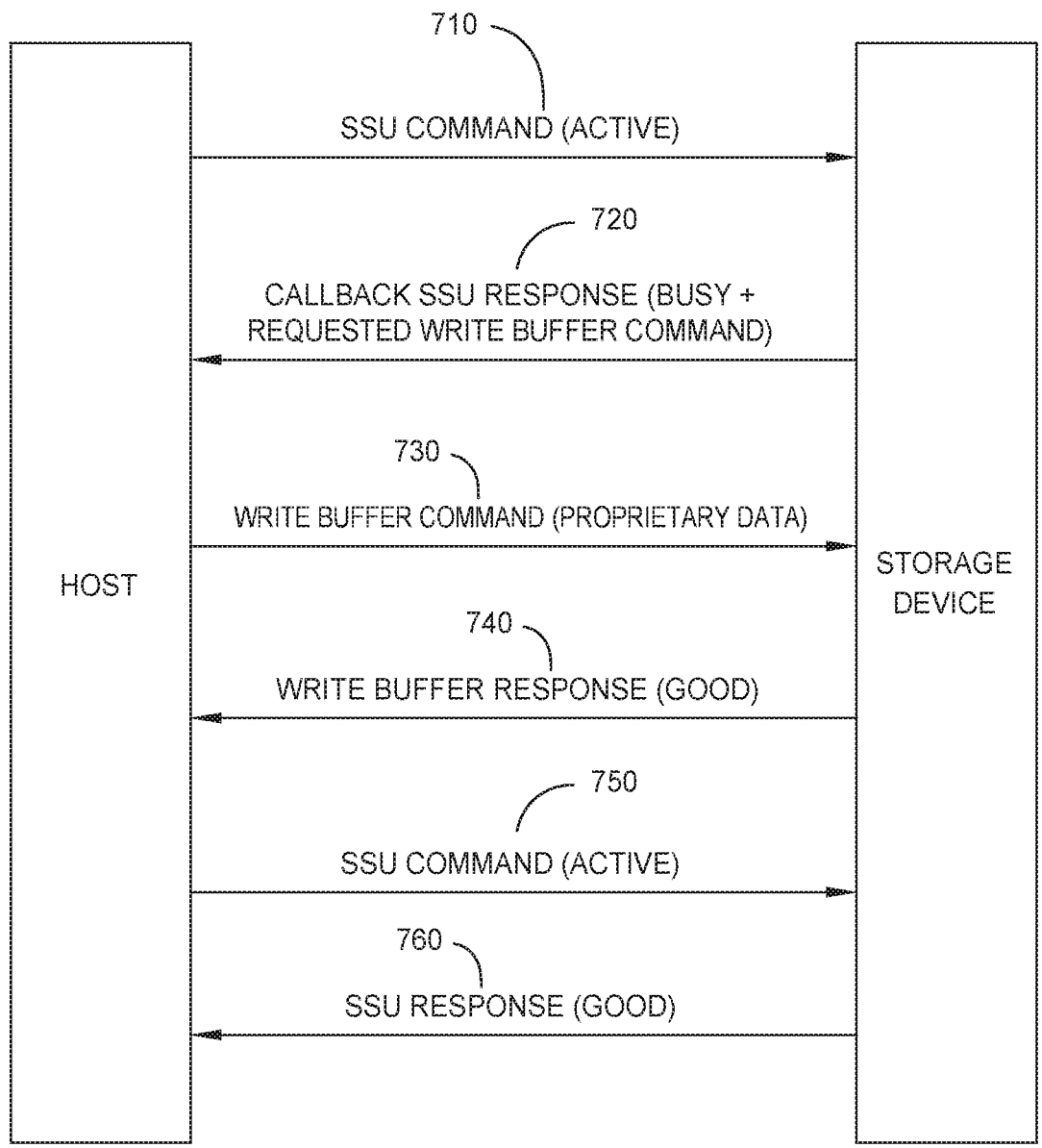
FIG. 7 is a diagram of the certain embodiments of the command and responses received and sent by the storage device from and to the host to place the storage device in an active mode.

FIG. 7 is a diagram of the certain embodiments of the commands and responses received and sent by the storage device from and to the host, such as command UPIUs and response UPIUs received and sent by storage device 110 from and to host 102 of FIG. 1 or other suitable storage systems, to place the storage device in an active mode.

A SSU command UPIU 710 with a power condition field of active is received by the storage device from the host. A SSU response UPIU 720 with a status field of busy and with a callback response containing a requested write command is sent by the storage device to the host. A write buffer command UPIU 730 is received by the storage device from the host. A write buffer response UPIU 740 with a status field of good is sent by the storage device to the host after executing the write buffer command. A SSU command UPIU 750 with a power condition field of active is received by the storage device from the host. The SSU command UPIU 750 is resent by the host as a recovery action to receiving a SSU response UPIU 720 of busy. A SSU response UPIU 760 with a status field of good is sent by the storage device to the host after executing the SSU command.

In certain embodiment, a method of sending a command from a slave storage device to a master host includes sending a response containing a requested command as a callback to or triggered by an initial command from the host. In one embodiment, the master host is a Universal Flash Storage (UFS) host and the slave storage device is a UFS storage device. The requested command may be in one or more fields of a response UFS protocol information units (UPIU). In one embodiment, a requested read buffer command of proprietary data is triggered by a sleep or powerdown command in conjunction with a requested write buffer command of the proprietary data triggered by an active command. The storage device uses the proprietary data written to a buffer of the storage device to more quickly or more efficiently return the internal state of the storage device to an active mode from a sleep more or powerdown mode.

While the foregoing is directed to embodiments of the present disclosure, other and further embodiments of the disclosure may be devised without departing from the basic scope thereof, and the scope thereof is determined by the claims that follow.

What is claimed is:

1. A method of operating a storage device in a storage system including a host, comprising:
  receiving a start stop unit (SSU) command with a power condition field of sleep or powerdown from the host;
  sending a callback response containing a requested read buffer to the host;
  receiving the requested read buffer command from the host;
  executing the requested read buffer command by the storage device; and
  executing the SSU command by the storage device.

2. The method of claim 1, wherein executing the requested read buffer command comprises reading proprietary data from a volatile memory buffer of the storage device selected from a group consisting of part of or a whole flash related table, an encryption key, a virtual memory setting, and combinations thereof.

3. The method of claim 1, wherein the requested read buffer command of the callback response is contained in one or more reserved fields of a response UPIU.

4. The method of claim 1, wherein the requested read buffer command is executed before the start stop unit command.

5. The method of claim 1, wherein the storage device is a slave device and the host is a master device.

6. The method of claim 1, wherein the callback response includes a busy status.

7. The method of claim 6, further comprising receiving for a second time the SSU command after the requested read buffer command is received.

8. A storage device, comprising:
a non-volatile memory; and
a UFS controller, wherein the UFS controller is configured to:
receive a start stop unit (SSU) command with a power condition field of sleep or powerdown from the host;
send a callback response containing a requested read buffer to the host;
receive the requested read buffer command from the host;
execute the requested read buffer command by the storage device; and
execute the SSU command by the storage device.

9. The storage device of claim 8, wherein executing the requested read buffer command comprises reading proprietary data from a volatile memory buffer of the storage device selected from a group consisting of part of or a whole flash related table, an encryption key, a virtual memory setting, and combinations thereof.

10. The storage device of claim 8, wherein the requested read buffer command of the callback response is contained in one or more reserved fields of a response UPIU.

11. The storage device of claim 8, wherein the requested read buffer command is executed before the start stop unit command.

12. The storage device of claim 8, wherein the storage device is a slave device and the host is a master device.

13. The storage device of claim 8, wherein the callback response includes a busy status.

14. The storage device of claim 13, wherein the controller is further configured to:
receive for a second time the SSU command after the requested read buffer command is received.

15. A storage device, comprising:
a non-volatile memory;
means to receive a start stop unit (SSU) command with a power condition field of sleep or powerdown from the host;
means to send a callback response containing a requested read buffer to the host;
means to receive the requested read buffer command from the host;
means to execute the requested read buffer command by the storage device; and
means to execute the SSU command by the storage device.

16. The storage device of claim 15, wherein the means to execute the requested read buffer command is configured to read proprietary data from a volatile memory buffer of the storage device selected from a group consisting of part of or a whole flash related table, an encryption key, a virtual memory setting, and combinations thereof.

17. The storage device of claim 15, wherein the means to execute the requested read buffer command of the callback response is contained in one or more reserved fields of a response UPIU, and wherein the means to execute the requested read buffer command is configured to execute the read buffer command before the start stop unit command.

18. The storage device of claim 15, wherein the storage device is a slave device and the host is a master device.

19. The storage device of claim 15, wherein the means to receive the callback response includes a busy status.

20. The storage device of claim 19, further comprising:
means to receive for a second time the SSU command after the requested read buffer command is received.

* * * * *